UNITED STATES PATENT OFFICE.

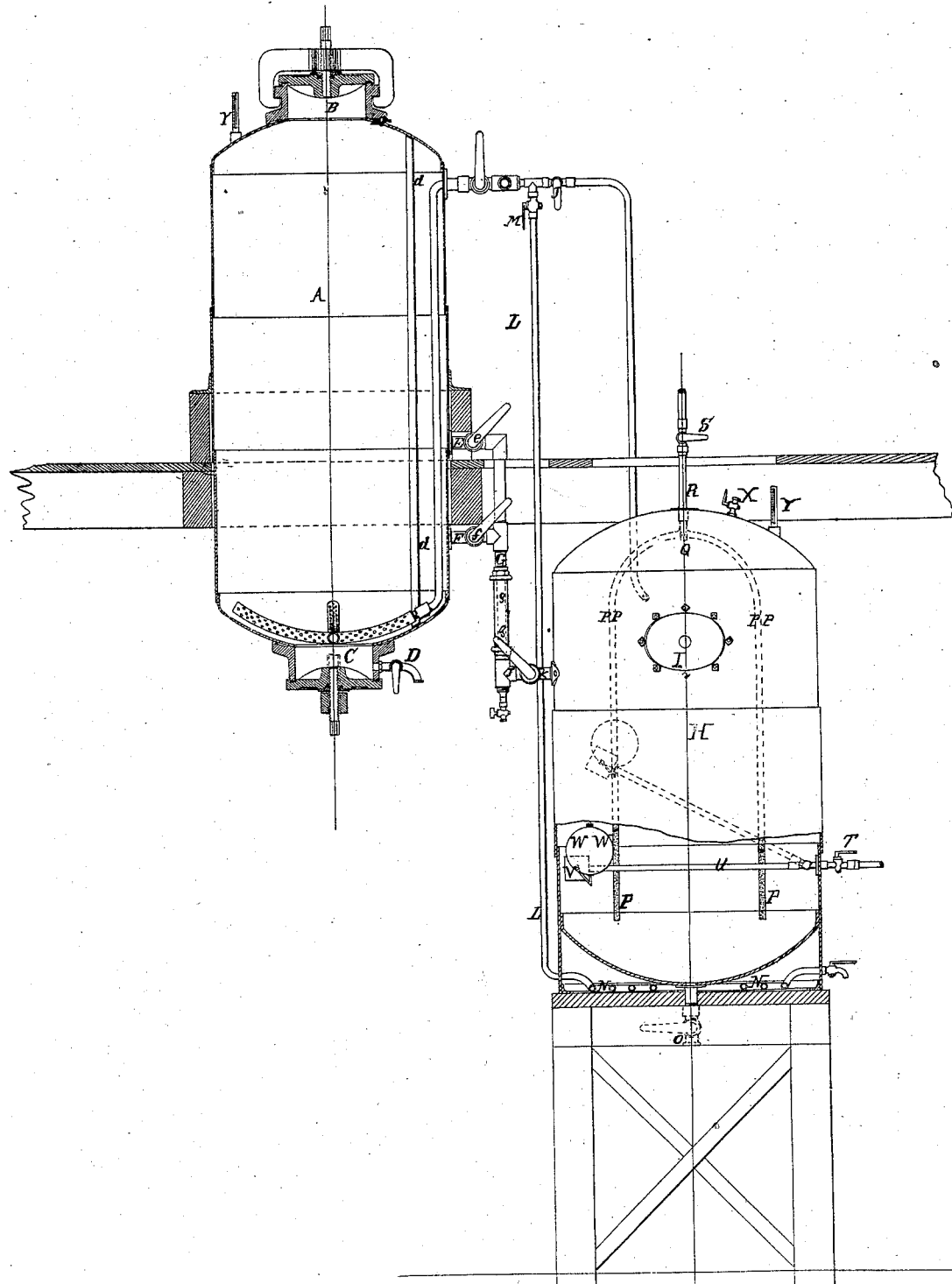

CARROLL E. GRAY, OF ST. LOUIS, MISSOURI.

IMPROVEMENT IN APPARATUS FOR RENDERING OILS AND FATS.

Specification forming part of Letters Patent No. 39,565, dated August 18, 1863.

*To all whom it may concern:*

Be it known that I, CARROLL EUGENE GRAY, of the city of St. Louis, in the county of St. Louis, in the State of Missouri, have invented a new and useful Improvement in Apparatus for Extracting, Rendering, and Purifying Oleaginous and Fatty Matters and Delivering the Same; and I do hereby declare that the following is a clear, full, and exact description of the same, reference being had to the annexed drawing, making a part of this specification, and to the letters of reference marked thereon.

By the present plans of rendering and purifying oleaginous and fatty matters by steam-pressure, even including the latest improvements of means of delivery while under pressure, it is found that when vent is given which is necessary to such delivery, the contents of the digester, or the vessel in which it is being rendered, from the natural laws of all fluids under pressure, it is so violently agitated that the smaller particles of material which should be precipitated to the bottom of the digester are injuriously mixed with the fluid fat and driven out with such velocity that they tend to choke up the perforations of the strainer, and afterward settle with great difficulty in open vessels, from being under atmospheric influences; secondly, the heated vapor and volatile portions arising from the melted fat thus thrown off and exposed, disseminating throughout the factory and its vicinity, are not only obnoxious but wasteful; thirdly, it should be borne in mind that fatty matters melted under pressure are necessarily heated to a temperature far beyond the natural temperature at which fats are melted—therefore running off such fluid fat so highly heated into open vessels exposes it to unnatural chemical circumstances; fourthly, that open receivers do not afford sufficient facilities for treating, experimenting upon, permeating, or purifying the fluid fat, and the impurities dispersed among the fat are allowed to decompose before they have time to precipitate.

The object of my invention is to remove the fluid fat from the action of the steam as soon as it is properly melted without taking off the pressure of steam from the digester, and to remove the fat quietly without such violent mechanical mixture with the condensed water and impurities as must of necessity be the case with any fluids forced out by steam-pressure through pipes or apertures directly into the atmosphere, and to provide a means of at any time accurately or continuously observing the condition of the fluid fat as it leaves the digester, as also to treat and purify the fluid fat while it is being cooled down to a suitable temperature to be exposed in open vessels; and it consists in its most essential features of a cylindrical vessel, which I term a "receiver," similar to the usual digester in dimensions, and of sufficient strength to resist high-pressure steam. I place this in a vertical position on one side, and about two-thirds of its length or height below the usual digester, and when the fatty matter is melted I turn steam into the second vessel or receiver until the thermometer indicates an equality of temperature and pressure in each vessel. Then I open a connection between the two vessels, having the suitable appliances for straining fluid fat, which would then by the law of gravity flow quietly and undisturbedly into the second or lower vessel; or when the receiver cannot be conveniently placed below the level of the digester it may be placed in a more elevated position by slightly decreasing the steam-pressure in the receiver, leaving the small particles of material or impurities to settle downward in the digester, instead of being violently drawn off with the fluid fat, and this is effected without having taken off the pressure from the digester. Then the connection could be shut off for the refuse in the digester to be recooked, and the fluid fat in the receiver to quietly settle, and after it is cooled down to the natural temperature of fluid fat it could be run off into vessels, by which means the volatile portions of the melted fat would be retained and prevented from being disseminated into the atmosphere, which of necessity is the case when the melted fat is drawn into open vessels directly from the digester, in which it has been treated under high pressure.

To enable others skilled in the art to make and use my invention, I will proceed to describe its construction and operation.

The drawing represents an ordinary "steam-tight digester," A, having a man-hole, B, in the top, and a hole, C, for drawing out the refuse at the bottom; also, a cock, D, for drawing off the condensed water, and is supplied with steam in the usual manner. The same is also provided with a strainer, $d\ d$, communicating with the connections E and F, regulated by the cocks $e\ f$, and leading by the pipe G to the receiver H. In the pipe G, I fit the glass tube $g\ g$ by the collars $i\ i$, made steam-tight, like the glass of a water-gage. The receiver H is provided with a man-hole, I. The entrance steam-cock J is for admitting steam to equalize the pressure in both vessels. The small steam-pipe L, with cock M connected to coil N, is for heating the bottom of the receiver to accelerate precipitation while the fluid fat is being cooled down and purified. In the bottom of the receiver is shown the draw-off cock O.

The letters P P P P represent four perforated pipes, connected at the junction Q with the pipe R, regulated by the cock S, through which could be forced water, or medicated water to be ejected by a multitude of fine streams to all parts of the fluid fat contents. The outlet-cock T is connected to the jointed or moving pipe U, having the strainer V, and supported by the floats W W, for drawing off the supernatant fluid. Where extra purification is required, it may be desirable to fit a mechanical means in the interior of the receiver to put the melted fat in gentle circulation to cause its more effectual mixture with the washing or purifying fluid forced from the perforated pipes, or similar means of distributing the purifying agent. When the fluid fat is cooled down sufficiently for exposure to the atmosphere, the vent-cock X is opened to admit atmosphere to allow the fluid fat to flow through the pipe U and the outlet-cock T into open vessels for congelation. The thermometer Y is used to indicate the temperature, that the pressure may be known. When this mode of treatment is in operation for rendering, purifying, cooling down, and delivering oleaginous and fatty matters, the materials are put into the vessel A through the man-hole B, which is then secured, and steam being let in until the fat is melted or treated. Then the steam-cock J is opened, and steam is admitted into the receiver H to obtain a similar temperature and pressure with the vessel A. The melted fat, being filtered by the strainer $d$, is allowed to pass off through the upper cock, E, the material being inspected through the glass tube $g\ g$, when it continues through the lower pipe, $j$, and cock $k$ into the receiver H. When the fluid fat in the digester is below the level of the cock E, the cock F is opened, and the fluid is allowed to pass through so long as the glass shows the fat to be in the proper condition for withdrawal. While the fat is properly melted, it is thus drawn off, but so soon as it appears cloudy or otherwise unsatisfactory, the cock F is closed and the oleaginous material in the digester A is cooked until whatever fat may remain in the contents is extracted. The fluid fat in the receiver H is then treated with water, or medicated water, as may be desired, for purification, through the junction Q and perforated pipes P P P P, or like means for effectual distribution, by which means the cooling down is accelerated. Then it is allowed to remain to settle until its temperature is sufficiently reduced for its delivery into open vessels to congeal. Then the vent-cock X is opened, and the supernatant fluid fat is allowed to flow by gravitation through the jointed pipe U, the moving end of which is protected by the strainer V, supported by the floats W W, and it passes through the outlet-connection at cock T into vessels for congelation. Then the condensed water and dreg is drawn off by the cock O in the bottom of the receiver. The remaining refuse in the digester, after all the fat that can be obtained has been extracted, is allowed to pass off through the outlet-hole C into a suitable tub.

I claim as my invention and desire to secure by Letters Patent—

1. The application of a second steam-tight vessel for receiving melted fat or other fluid material that may have been cooked under steam pressure, and for cooling down and purifying the same until it is in a proper condition for exposure to the atmosphere, substantially as before described.

2. The placing of a glass tube in the draw-off pipe from the digester or similar apparatus for the treatment of material under steam pressure, for the purpose specified, substantially as before described.

CARROLL E. GRAY.

Witnesses:
H. S. FIRMAN,
J. S. BROWN.